H. S. FRANK.
PROCESS OF MAKING MULTIPLE MOLDS AND CASTINGS.
APPLICATION FILED OCT. 1, 1918.
1,358,435. Patented Nov. 9, 1920.
5 SHEETS—SHEET 1.
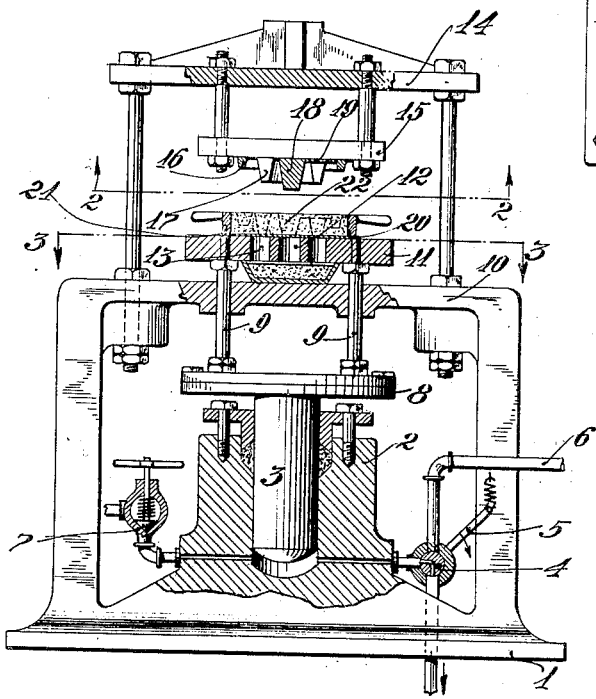
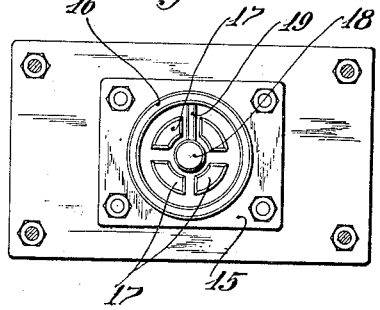
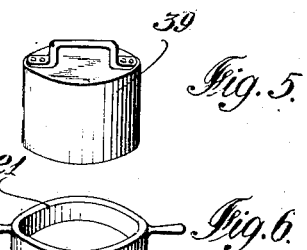
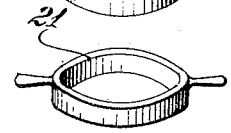
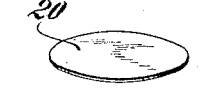
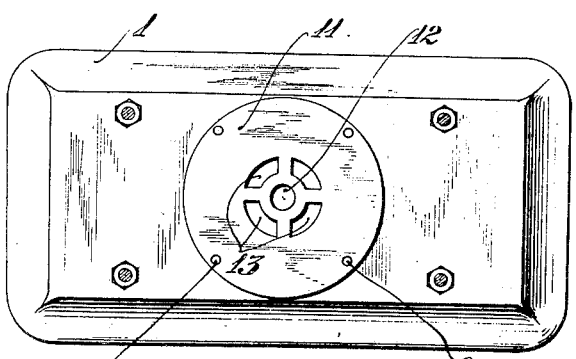
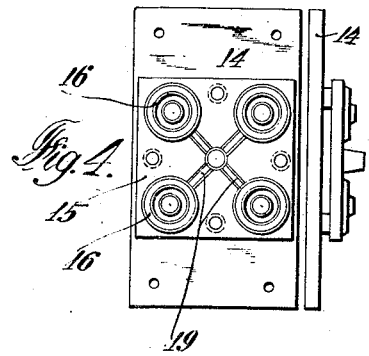
Inventor
Harry S. Frank
By his Attorney
Paul M. Klein

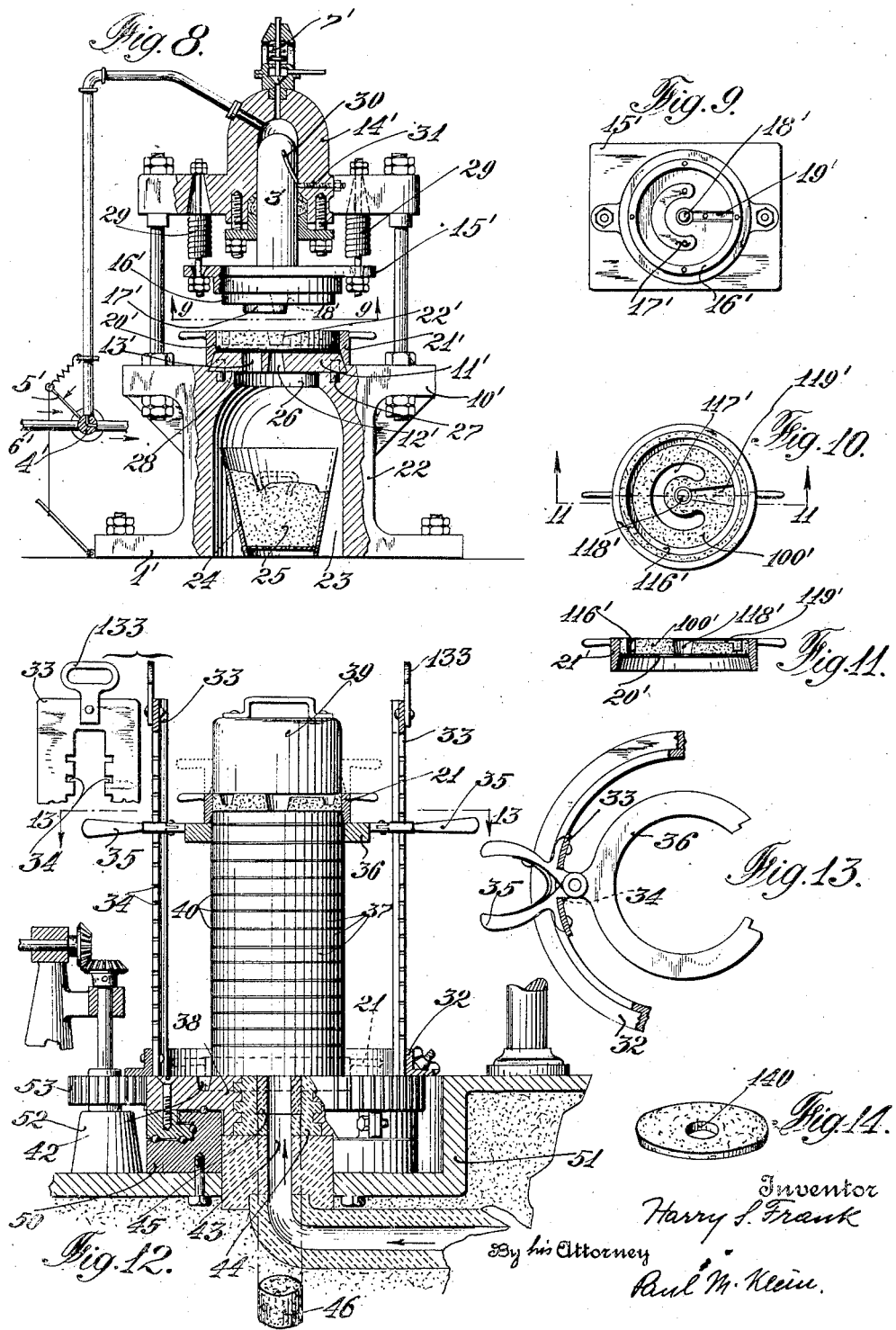

H. S. FRANK.
PROCESS OF MAKING MULTIPLE MOLDS AND CASTINGS.
APPLICATION FILED OCT. 1, 1918.
1,358,435.
Patented Nov. 9, 1920.
5 SHEETS—SHEET 3.
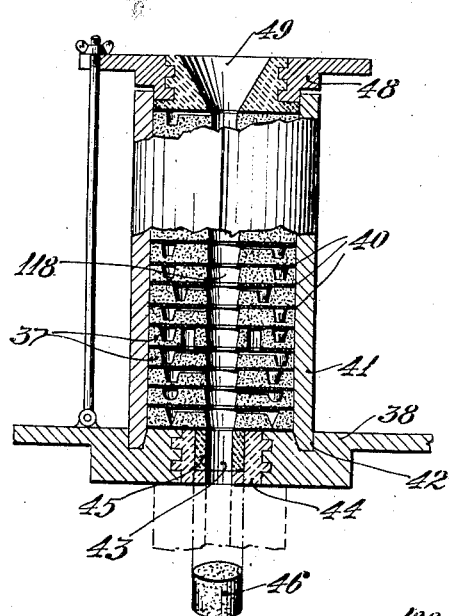
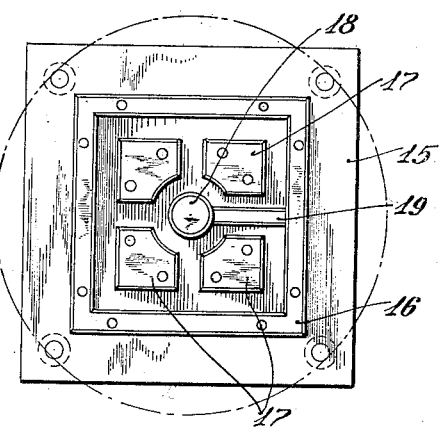
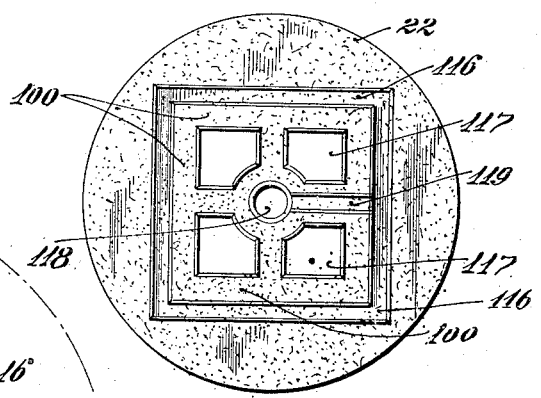
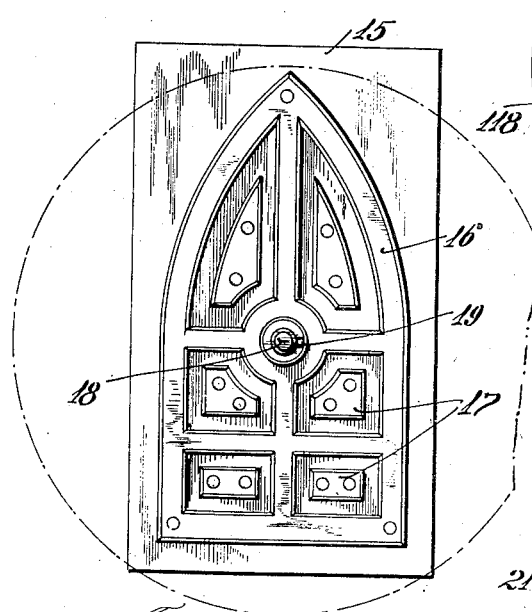
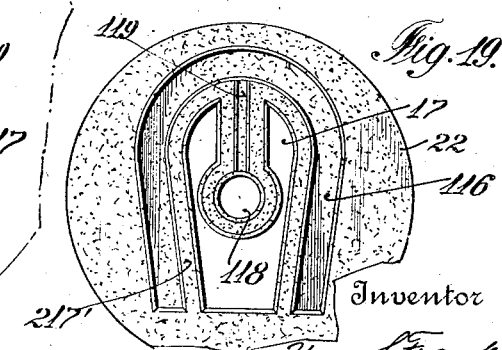
Inventor
Harry S. Frank
By his Attorney
Paul W. Klein

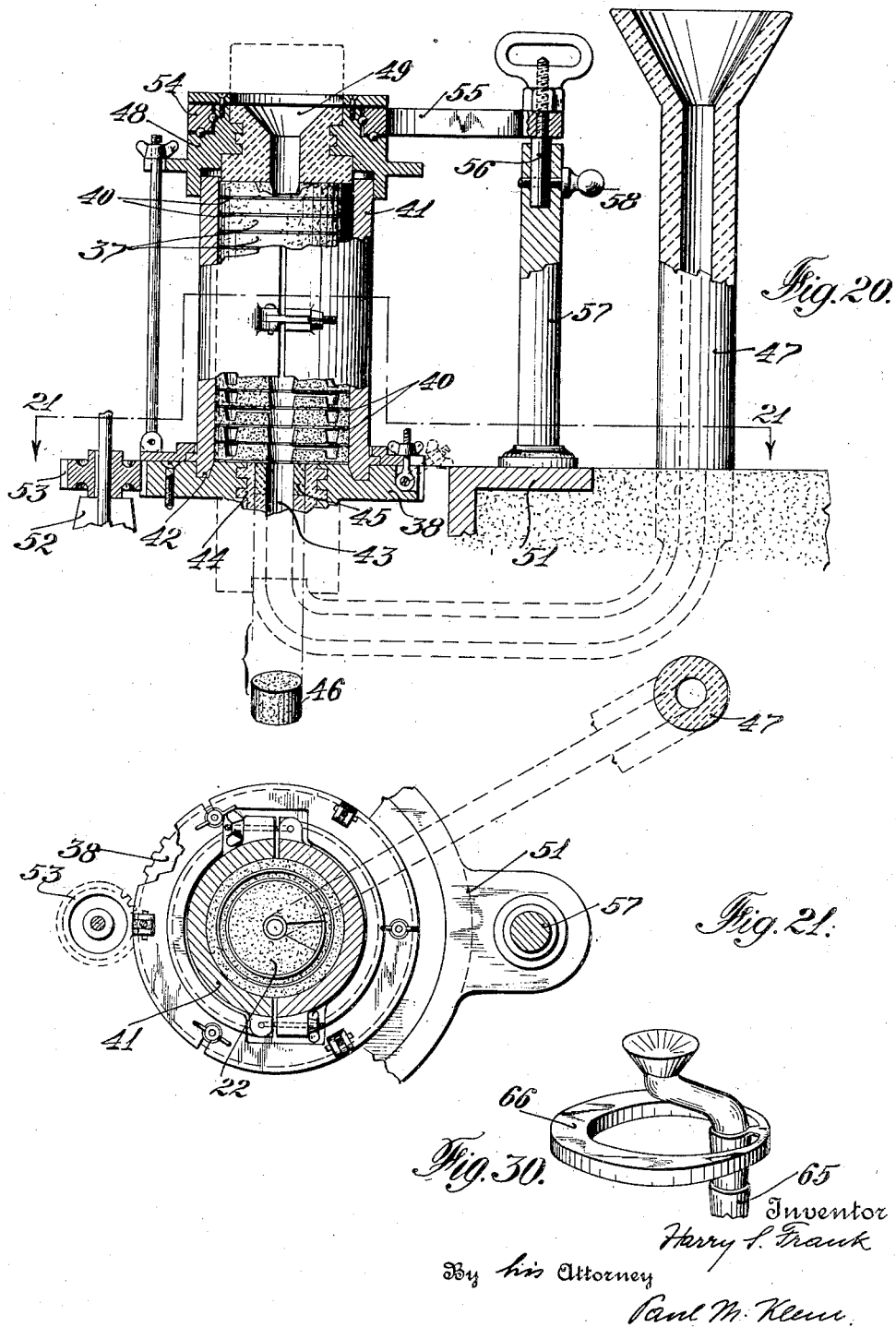

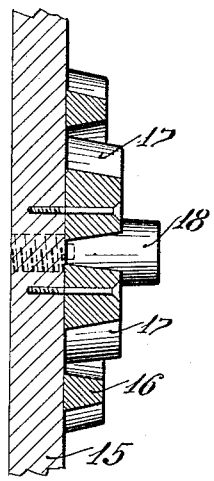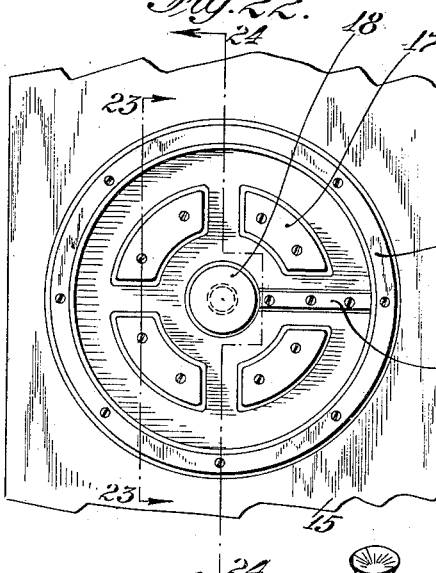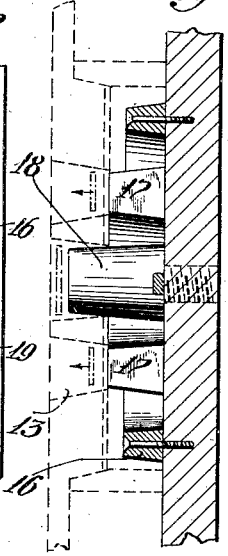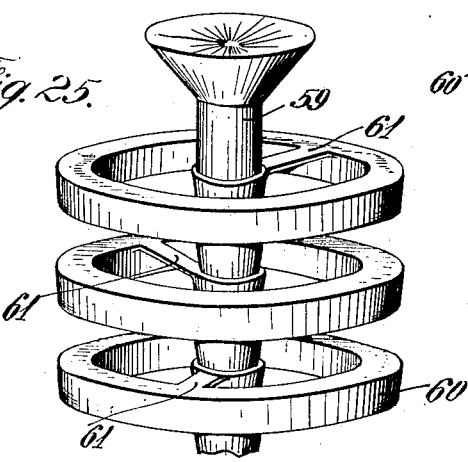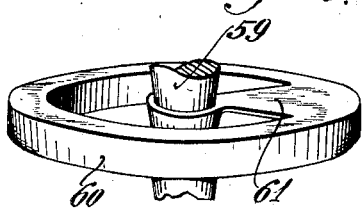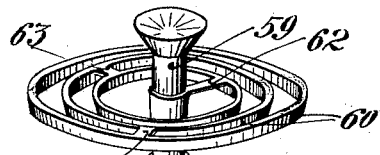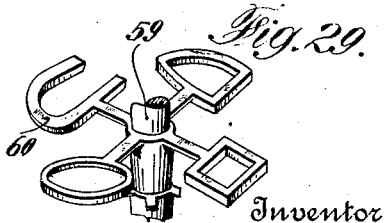

UNITED STATES PATENT OFFICE.

HARRY S. FRANK, OF WOODMEER, NEW YORK.

PROCESS OF MAKING MULTIPLE MOLDS AND CASTINGS.

1,358,435. Specification of Letters Patent. Patented Nov. 9, 1920.

Application filed October 1, 1918. Serial No. 256,436.

*To all whom it may concern:*

Be it known that I, HARRY S. FRANK, citizen of the United States, and resident of Woodmeer, L. I., county of Nassau, and State of New York, have invented certain new and useful Improvements in Processes of Making Multiple Molds and Castings, of which the following is a specification.

This invention relates to multiple molds and castings, and it consists in the process of manufacture hereinafter described.

The objects of my invention are to provide a simple, efficient and labor saving process for producing in quantities frameless molds for making multiple castings with one pouring operation.

Other objects are to provide a process for producing molds with central or sidewise pouring passages, permitting, when the molds are grouped for pouring, all molds to be filled by way of the interconnecting pouring passages.

Further objects are to provide a process for producing molds with thin walls adjacent to the mold forms impressed into the molds so as to allow their collapsing when the poured in metal cools off and shrinks, thus saving the castings from bursting; to provide a simple way of making straight wall molds for producing straight wall castings, which castings, when taken from the molds, require but little or no machining in order to be faced off.

Still other objects of this invention are to provide a process for producing a plurality of castings at one time; for producing a multitude of castings in a tree form, at one time; for producing groups of castings in tree form; for permitting the pouring operation to take place from either the top or bottom.

Still further objects are to provide a process for producing castings of variable density of grain, the outer portion of which have closer grain than the inner portion, for making ring castings of different sizes and forms, for making eccentric ring castings having variable density of grain at their inner and outer walls and for casting a multitude of rings at one time from either top or bottom.

These and further objects will be more fully elucidated hereafter in the following specification, and by the accompanying drawings, forming a part of latter.

The drawings, while illustrating specific mechanical devices for facilitating the process of manufacture, are in no way essential to the art, and serve only for explanatory purposes.

The illustrations, showing a limited number of molds and castings, are to bring forth the characteristic features of a vast number of possible products arrived at by employing my process of manufacture. In the drawings:—

Figure 1 is a side elevation, partly in section, of a molding machine.

Fig. 2 is a sectional view taken on line 2—2 of Fig. 1 showing a molding die.

Fig. 3 is a sectional view taken on line 3—3 showing a matrix.

Fig. 4 represents a bottom view and side elevation of a multiple die.

Fig. 5 is a perspective view of a weight used for extracting the ready mold from its frame.

Fig. 6 represents a perspective view of convenient form of a mold frame.

Fig. 7 is a perspective view of a mold separating sheet.

Fig. 8 is a side elevation, partly in section, of another molding machine.

Fig. 9 is a plan view of a die seen from line 9—9 of Fig. 8.

Fig. 10 is a plan view of a mold frame containing a finished mold.

Fig. 11 is a sectional view through Fig. 10 on line 11—11.

Fig. 12 is a side elevation partly in section, of part of a rotary mold holder and of a removable mold setter.

Fig. 13 is a sectional view of the mold setter on line 13—13 of Fig. 12.

Fig. 14 is a perspective view of refractory mold separating sheet.

Fig. 15 is a side elevation, partly in section, of a stationary mold holder, showing various finished molds inclosed therein.

Fig. 16 is a plan view of a molding die for a square casting, the broken line indicating the shape of the future mold.

Fig. 17 is a plan view of finished mold for a square casting.

Fig. 18 is a plan view of a molding die for an iron stand, the circle in broken line indicating the shape of the future mold.

Fig. 19 is a plan view of a finished mold for a horse shoe casting.

Fig. 20 is a side elevation, partly in section, of a mold holder arrangement ready for receiving molten metal.

Fig. 21 is a sectional view through Fig. 20 on line 21—21.

Fig. 22 is a plan view of a die for a ring casting.

Fig. 23 is a sectional view through Fig. 22 on line 23—23.

Fig. 24 is a sectional view through Fig. 22 on line 24—24.

Fig. 25 is a perspective view of a tree casting.

Fig. 26 is a perspective view of a part of another tree casting.

Figs. 27, 28, 29 and 30 represent perspective views of various forms of tree castings.

Referring to the drawings, Figs. 1, 2, 3, 4, 5, 6 and 7 illustrate devices for making tapered wall molds, Figs. 8, 9, 10 and 11 devices for producing straight wall molds.

In the first mentioned figures, 1 indicates the base of a stationary frame having an upright extension 2 in which plays a hydraulic piston 3 being operated by means of a valve 4 and lever 5, controlling the inflow through supply pipe 6 of fluid under pressure which operates the piston 3. A safety valve 7 governs the pressure of the power fluid.

At the free upper end of the piston 3 and mounted on its disk 8, guide rods 9 pass through the frame platform 10 and support an exchangeable matrix 11, which may take any desired form, and is preferably equipped with a central aperture 12 and a plurality of apertures 13 varying in number, shape and size depending upon the form to be impressed into the mold. Opposite to the matrix 11 and removably attached to the upper frame 14 an exchangeable die holder 15 possesses, besides a die 16, elevated portions 17 surrounding a central boss 18 which register with the apertures in the matrix 11. Connecting boss 18 and die 16 is a bridge 19 impressing into the mold a pouring canal 119 (Fig. 17).

When operating the machine, a perforable separating sheet 20, (Fig. 7), preferably made of inflammable material like paper, is placed upon the matrix, covering its apertures, and a removable temporary mold frame 21 (Fig. 6) is set upon the paper sheet.

Loose mold material 22 is then placed into the recess formed by frame 21 and the sheet 20, filling it substantially flush with the top. The lever 5 is then pressed down, as indicated by the arrow, and the valve 4 normally permitting the fluid behind the piston to escape, now connects the supply pipe with the piston cylinder, causing latter to ascend, thus forcing mold material 22 against the die holder 15. First the boss 18 and then the elevated portions 17 press against the mold material and eject portions of same through sheet 20, which breaks, and allows the ejected material to fall into a receiver underneath the matrix 11. The boss 18 and elevations 17 now fill free spaces 117 and 118, indicated in broken lines, (see also Figs. 17 and 24), while the piston still rises, causing the impression into the remaining mold material of the die 16 and the connecting bridge 19. At the same time the loose mold material is compressed to a solid mass, spread against the walls of the frame 21, so as to adhere thereto sufficiently to allow the carrying from place to place of the frame with its ready mold. The separating sheet 20 forms the bottom of the mold and remains attached thereto.

The Figs. 8, 9, 10 and 11 illustrate similar devices to that described above, with the difference that the exchangeable matrix 11' is stationary while the die plate 15' is operated through piston 3'. The operation of the piston 3' is controlled by valve 4', lever 5' governing the fluid under pressure supplied through pipe 6', and a safety valve 7' maintains the desired pressure behind the piston.

Extending upward from the machine base 1' a stationary frame 22' forms a hollow space 23 at its center to allow a barrel 24 to be placed therein for receiving ejected mold material 25, falling through opening 26 in the frame platform 10'. Adjacent to the opening 26 are the depressions 27 forming extension of the recess 28 which is provided to receive a matrix 11' equipped with pins registering with the depressions 27 and preventing a sidewise motion of the matrix 11'. The matrix again may have a center opening 12' and one or more side apertures 13' for permitting the ejection of portions of mold material 22' resting upon separating sheet 20' and encircled by temporary mold frame 21'. As may be readily seen in Fig. 11, the mold frame 21' may be tapered at its lower half so as to fit upon the tapered matrix 11' and when removed with the ready fold to leave a space below the mold thus facilitating a true setting up in a stack of a number of similar molds, (see Fig. 12).

The operation of piston 3' is somewhat different from that shown in Fig. 1. The piston moving downward being driven by a pressure fluid, would not, owing to its weight, travel inward. Therefore coil springs 29 are provided, being attached to upper frame 14' and the die holder 15'. The way of their suspension serves a double purpose, not only causing the back travel of the piston, but also simultaneously permitting a turning motion while the piston reciprocates. The turning motion may be produced by a recess 30 made into the piston 3' describing a part of a shallow helix, and an adjustable and removable guide screw 31 sliding therein when the piston is operated.

This turning motion is particularly advantageous in making straight wall molds for producing straight wall castings. (See Figs. 11 and 26.)

In operation, the piston 3' being forced down while slightly turning, causes the boss 18' and the elevated portion 17' to expel portions of the mold material and to fill the thus formed free space for preventing more material from voluntarily escaping. When the piston travels still lower, the straight wall die 16', and finally the connecting bridge 19' is impressed into the remaining mold material. The bridge 19' makes a sector-like impression 119' into the mold material (Fig. 10) while the extension 17' produces an opening 117' greater than its own length.

The purpose of expelling portions of mold material through sheets 20', 20 and the apertures 13', 13 in the matrices 11', 11 by the elevated portions 17' (and 17 in Fig. 1) is to create relatively thin walls 100' and 100 adjacent to the inner walls of the mold forms 116' and 116. (Figs. 10, 17 and 19.) These thin mold walls 100' and 100 serve to safeguard the castings from bursting when cooling off and shrinking, the walls giving way and collapsing when the metal shrinks. If solid mold material filled the space inside the casting, the latter would not be able to overcome the resistance of the solid material, and would crack in some place, making it unfit for use.

The above described two kinds of molding machines are to explain simple ways of making single or multiple molds, and also to show that the operation of dies or molds may be reversed. It is obvious that, while illustrating these machines in the drawings, they are not at all essential for producing the desired mold shapes, which may be made by hand without any difficulties and possess the desired features covered by the claims.

The ready molds, having an imflammable sheet 20', 20 at their bottom, a pouring passage 118', 118, thin walls 100', 100, formed by the free spaces 117', 117, a mold form 116', 116 and a connecting canal 119', 119 (Figs. 10, 11, 17 and 19), or the equivalent of these items now are set up in a stack preparatory to the pouring operation and separated by refractory disks 40 (Figs. 12, 15 and 20) shown in Fig. 4 in perspective view. These disks possess openings 140 matching with the pouring passages of the molds but prevent melted metal from unduly filling the apertures 117', 117 by way of the connecting canals 119', 119.

The setting of the molds may be facilitated by a setting device shown in Figs. 12 and 13, a temporary mold frame 21', 22 and a weight 39, illustrated in Fig. 5.

The mold setter consists of a flanged base ring 32 to which upright guides 33 are fastened. At their slotted portion notches 34 are provided for receiving spring-operated lock handles 35, attached opposite each other to a mold frame rest 36. Eye handles 133 permit the transportation of the mold setter.

The use of the mold setter is self evident. After the first mold, in its temporary frame has been set upon the mold rest 38 as indicated in broken lines, the weight 39 is placed upon the mold and the frame is removed. Then the frame rest 36 is moved down to its lowest position, a separating sheet 40 is placed upon the first set mold and a second mold frame is set upon the frame rest. Then again the weight 39 is placed upon the mold and the frame is removed. For the setting of the next mold the frame rest is raised one notch higher and the process is repeated until the required number of molds 37 is set up, whereupon the mold setter is removed. The pouring apertures 118', 118 of the molds and the openings 140 in the separating sheet 40 form a continuous pouring passage, while the connecting canals 119', 119 make connections from the pouring passage to the mold forms. Now the molds are held firmly together and the pouring may take place from either top or bottom, filling the mold forms at one operation with melted metal. Various means may be applied to hold the molds during pouring, but only two forms are illustrated for explanatory purposes in Figs. 12, 15, 20 and 21, showing a stationary and a rotatable type of a mold holder, provided with facilities for pouring from either top or bottom.

The mold rest 38 possesses a recess 42 for guiding first the temporary mold frame when setting the bottom mold into place, and second to receive a hull 41 made of two or more parts connected with each other, when inclosing the molds 37 by easily operable locking means, for instance hinged screws with wing nuts, as shown in the drawings. A refractory inlay 44 is provided in the mold seat 38, having a bottom pouring inlet 43, enlarged at its upper portion for receiving either a nipple 45, when pouring from the bottom, or a plug 46 when pouring from the top. In order to facilitate the pouring from the bottom of the molds, a pouring pipe 47, ending in a funnel, connects with pouring passage 43 and consequently with the mold pouring passages 118. For facilitating the pouring from the top and to assure a firm hold upon the molds, a mold cover 48 is set upon the upper mold and is connected by hinged bolts to the mold seat 38 and the hull 41. The funnel shaped opening 49, made into an inlay of refractory material, connects with the pouring passages 118 of the molds 37 and serves either as pouring place or for inspection of the rising metal when pouring from the bottom.

It is understood that there is no limitation as to the number of molds or the shapes of the mold forms which may be used in my multiple casting process. In Fig. 15, a variety of mold forms is indicated, while Figs. 2, 4, 9, 10, 11, 16, 17, 18, 19, 22, 23 and 24 show different forms of dies and molds. The Figs. 25, 26, 27, 28, 29 and 30 illustrate typical samples of various castings produced by application of my process.

It is often found desirable to produce castings of variable density and to eliminate as far as possible the formation of gas bubbles in the castings. With my method of piling up and rigidly holding in place the piled up molds, the only outlet for the gases, forming when pouring, would be the common pouring passage, while there would be practically no space at the edge of the molds. I therefore include in my process the use of a separating sheet 20 placed at the bottom of each mold. This sheet is ignited when the melted metal is poured into the molds and through its ashes the coal gases are permitted to escape, preventing however, the metal from leaving its proper place.

The variation in density of the casting is accomplished by rotating the entire mold stack during pouring or immediately after pouring, while the metal is still in liquid form. This may, for instance, be accomplished by making the mold rest 38 a rotary base. In Figs. 12, 20 and 21 may be seen a convenient form of such an arrangement. Upon a stationary ball bearing 50, rigidly attached to a base tray 51, rests the mold seat 38, now taking the shape of a spur gear. Engaging the spur gear a pinion 53 sits upon boss 52 and may be driven from any convenient power source. The mold cover 48 is guided in a ring bearing 54 forming with the cover 48 a part of a removable connecting brace 55, supported, by way of pin 56, in a standard 57 and locked thereto with a lock pin 58. When all the parts are set into proper place, the molds are ready for receiving the melted metal. The rotary motion causes the metal to gradually increase its density in the direction from its axis of rotation to its periphery, driving out simultaneously the gas bubbles which may form. Thus the outer casting walls will have a closer grain than the inner walls.

Often it is desired not only to have the outer walls of closer grain, but also to harden the outer surface. An artificial water or air cooling system may be provided. However, an illustration of same is omitted, as such improvements are self understood.

Referring to Figs. 25 to 30, representing various typical casting types, termed tree castings, produced by my novel process, 59 indicates the tree trunk, the reproduction of the pouring passages 118, 60 are the actual castings representing the reproduction of their corresponding mold forms 116, and the connecting bars 61 are the reproduction of connecting canals 119. Figs. 26 and 30 represent straight wall castings, Fig. 30 having the trunk 65 out of center while the casting 66 itself is eccentric.

Fig. 27 showing a tree casting of various single cast forms at different altitudes, may be compared with the multiple casting in Fig. 29 having groups of various castings in one plan; these groups however are connected with the trunk at different altitudes.

A typical group-tree casting is illustrated in Fig. 28. Here the smallest of the castings 60 is directly connected with the trunk 59 through bar 62, the next larger cast form connects with the smallest by 63, the still larger form with the second by 64 and so on.

From the foregoing it is evident that my new process for producing multiple molds and castings is by no means dependent upon or limited to the devices shown in the drawings and described above. On the contrary, they are not essential in the production of molds and multiple castings, and are to serve, as said before, for demonstrating and explaining my new methods.

Therefore no claims are made for any specific machine.

I claim:—

1. The process of producing a quantity of ring castings at one time, consisting in piling to a stack a number of molds having therethrough a common passageway and pouring passages leading from the common passageway to each individual mold, and separating the molds from each other by refractory layers having apertures alined with the common passageway.

2. The process of producing a quantity of ring castings at one time, consisting in piling up a number of frameless molds, rigidly sustaining said pile into a mold stack, connecting all of the molds by a common passageway therethrough and independent pour passages leading to each mold from the common passageway, and separating the individual molds of the stack by a refractory layer having an aperture in alinement with the common passageway.

3. The process of producing at one time a quantity of castings, which comprises piling up a number of frameless molds, each having a pouring passage, connecting canals between said passage and said molds, separating said molds by refractory layers with apertures registering with the pouring passages of the molds, firmly holding in place the thus piled up and separated molds and pouring molten metal into said pouring passages from either top or bottom.

4. The process of producing at one time a quantity of straight wall castings, consisting of piling up into a stack a number of individual frameless molds, each of which has pouring passages registering with each other, connecting canals between said passages and straight wall mold forms, separating the molds from each other by refractory layers having apertures alined with said pouring passages, compressing and entirely inclosing said stack of molds and pouring molten metal from either top or bottom into said pouring passages.

5. The process of making a quantity of ring castings at one time consisting of piling up to a stack a plurality of molds, separated from each other by a refractory layer firmly holding said molds and refractory layers in place, and connecting all molds by one common passageway having branch canals leading to the individual mold forms.

6. The process of making at one pouring operation a multitude of ring castings consisting of stacking up to a pile and firmly holding a multitude of interconnected molds and inserting between each mold a refractory layer.

7. The process of making simultaneously a tree of castings of variable density having their outer walls of closer grain than their inner walls, which comprises piling up to a mold stack and firmly holding together a plurality of molds interconnected with each other, pouring molten metal into the molds by way of their interconnection and revolving the molds during the pouring operation until the metal cools off.

8. The process of making simultaneously a tree of castings of various density having their outer walls of closer grain than their inner walls, which comprises piling up in a vertical stack and firmly holding together a plurality of molds interconnected with each other, filling the molds by way of their interconnection, revolving them immediately after the pouring operation begins and while the metal is still in liquid form, and until the metal cools off.

9. The process of making simultaneously a plurality of castings in tree form, having variable density of grain, which is closer at the outer casting walls than at the inner walls, consisting of piling up to a stack a plurality of molds, separating them by refractory layers, interconnecting the molds through said layers with each other, grouping the molds in such a way as to balance the future castings when the molds are rotated, firmly holding together the entire mold stack, pouring molten metal into the molds by way of their interconnection either from the top or from the bottom and rotating the mold stack while the pouring operation is taking place, and until the metal cools off.

10. The process of producing at one pouring operation a multitude of connected ring castings having closer grain at their outer walls, consisting of piling up in a vertical stack a plurality of molds interconnected with each other, filling the molds with molten metal while revolving them.

11. The process of producing at one pouring operation a multitude of connected ring castings having their outer walls of closer grain than the inner walls, and having chilled outer surfaces, which comprises piling up in a vertical stack a plurality of molds interconnected with each other and separated from each other by refractory layers, firmly holding molds and layers together, pouring molten metal into the molds by way of their interconnection and rotating same while the pouring operation is taking place.

Signed at the city of New York in the county of New York and State of New York this 23rd day of September.

HARRY S. FRANK.

Witnesses:
JOSEPH MILLER,
ALDA M. FRANK.